US009317377B1

(12) United States Patent
Wu et al.

(10) Patent No.: US 9,317,377 B1
(45) Date of Patent: Apr. 19, 2016

(54) SINGLE-ENDED DEDUPLICATION USING CLOUD STORAGE PROTOCOL

(75) Inventors: David Tze-Si Wu, Fremont, CA (US); John S. Cho, Dublin, CA (US)

(73) Assignee: RIVERBED TECHNOLOGY, INC., San Francisco, CA (US)

( * ) Notice: Subject to any disclaimer, the term of this patent is extended or adjusted under 35 U.S.C. 154(b) by 538 days.

(21) Appl. No.: 13/070,064

(22) Filed: Mar. 23, 2011

(51) Int. Cl.
*G06F 15/16* (2006.01)
*G06F 11/14* (2006.01)

(52) U.S. Cl.
CPC ........ *G06F 11/1453* (2013.01); *G06F 11/1469* (2013.01)

(58) Field of Classification Search
CPC ... G06F 3/0608; G06F 3/0682; G06F 3/0634; G06F 3/0638; G06F 2211/1014; G06F 2211/1028; G06F 11/1453; G06F 11/1469
USPC ......................................................... 709/217
See application file for complete search history.

(56) References Cited

U.S. PATENT DOCUMENTS

| | | | | |
|---|---|---|---|---|
| 6,112,198 | A * | 8/2000 | Lohman | G06F 17/30445 |
| 8,315,985 | B1 * | 11/2012 | Ohr | G06F 11/1453 |
| | | | | 707/664 |
| 8,462,781 | B2 * | 6/2013 | McGhee | H04L 45/7453 |
| | | | | 370/389 |
| 2006/0109823 | A1 * | 5/2006 | Kikuchi | H04N 21/238 |
| | | | | 370/335 |
| 2006/0229957 | A1 * | 10/2006 | Broadwell | G06Q 40/08 |
| | | | | 705/35 |
| 2008/0244204 | A1 * | 10/2008 | Cremelie | G06F 11/2097 |
| | | | | 711/162 |
| 2008/0281908 | A1 * | 11/2008 | McCanne | G06F 17/30156 |
| | | | | 709/203 |
| 2008/0320156 | A1 * | 12/2008 | Chen | H04W 76/02 |
| | | | | 709/230 |
| 2009/0094318 | A1 * | 4/2009 | Gladwin | H04L 67/1097 |
| | | | | 709/203 |
| 2009/0132619 | A1 * | 5/2009 | Arakawa | G06F 3/0605 |
| 2010/0030797 | A1 * | 2/2010 | Johnson | G06F 3/0608 |
| | | | | 707/693 |
| 2010/0036864 | A1 * | 2/2010 | Augenstein | G06F 17/30336 |
| | | | | 707/696 |
| 2010/0082700 | A1 * | 4/2010 | Parab | G06F 17/30156 |
| | | | | 707/803 |
| 2010/0281207 | A1 * | 11/2010 | Miller | G06F 3/0608 |
| | | | | 711/103 |
| 2010/0332454 | A1 * | 12/2010 | Prahlad | G06F 17/3002 |
| | | | | 707/654 |
| 2011/0016091 | A1 * | 1/2011 | Prahlad et al. | 707/654 |
| 2011/0022718 | A1 * | 1/2011 | Evans | G06F 3/0608 |
| | | | | 709/231 |

(Continued)

*Primary Examiner* — Richard G Keehn
*Assistant Examiner* — Mohammed Ahmed
(74) *Attorney, Agent, or Firm* — Park, Vaughan, Fleming & Dowler LLP; Laxman Sahasrabuddhe (57) ABSTRACT

A single-ended optimized storage protocol enables storage clients or other devices to direct a remote data storage to copy data. In response to commands via the protocol, a remote data storage can copy portions of a data stream at the remote data storage to destination storage locations within the same or a different data stream. The protocol may be utilized for optimized transfer of data via a network to a remote data storage. An initial data stream is divided into segments. Redundant segments are removed from the data stream to form an optimized data stream, which is transferred to the remote data storage. Commands are issued to the remote data storage using the protocol to direct the remote data storage to reconstruct the initial data stream at the remote data storage using the optimized data stream and optionally segments from other data streams previously transferred to the remote data storage.

26 Claims, 5 Drawing Sheets

(56) References Cited

U.S. PATENT DOCUMENTS

| | | | |
|---|---|---|---|
| 2011/0099351 A1* | 4/2011 | Condict | G06F 3/0608 711/216 |
| 2011/0131390 A1* | 6/2011 | Srinivasan | G06F 3/0622 711/209 |
| 2011/0161680 A1* | 6/2011 | Grube | G06F 21/64 713/193 |
| 2011/0161723 A1* | 6/2011 | Taleck | G06F 17/30156 714/4.11 |
| 2011/0238634 A1* | 9/2011 | Kobara | G06F 3/0608 707/692 |
| 2011/0238775 A1* | 9/2011 | Wu | G06F 17/30233 709/213 |
| 2012/0016845 A1* | 1/2012 | Bates | G06F 3/0608 707/692 |
| 2012/0047113 A1* | 2/2012 | Weinberger | G06F 17/30584 707/693 |
| 2012/0047339 A1* | 2/2012 | Decasper | G06F 11/1076 711/162 |
| 2012/0084261 A1* | 4/2012 | Parab | G06F 11/1464 707/654 |
| 2012/0134494 A1* | 5/2012 | Liu | G06F 21/6218 380/44 |
| 2012/0233417 A1* | 9/2012 | Kalach | G06F 11/1469 711/162 |
| 2012/0303736 A1* | 11/2012 | Novotny | H04L 67/1097 709/213 |
| 2013/0179413 A1* | 7/2013 | Beirami | G06F 17/30303 707/693 |

\* cited by examiner

SINGLE-ENDED DEDUPLICATION USING CLOUD STORAGE PROTOCOL

BACKGROUND OF THE INVENTION

The present invention relates generally to data storage systems, and systems and methods to improve storage efficiency, compactness, performance, reliability, and compatibility. In general, data storage systems receive and store all or portions of arbitrary sets or streams of data. Data storage systems also retrieve all or portions of arbitrary sets or streams of data. A data storage system provides data storage and retrieval to one or more storage clients, such as user and server computers. Stored data may be referenced by unique identifiers and/or addresses or indices. In some implementations, the data storage system uses a file system to organize data streams into files. Files may be identified and accessed by a file system path, which may include a file name and one or more hierarchical file system directories. In other embodiments, data streams may be arbitrary sets of data that are not associated with any type of file system or other hierarchy.

Cloud storage services are one type of data storage available via a wide-area network. Cloud storage services provide storage to users in the form of a virtualized storage device available via a wide-area network (WAN), such as the Internet or a private WAN. In general, users access cloud storage services to store and retrieve data using web services protocols, such as REST, SOAP, or XML-RPC. Cloud storage service providers manage the operation and maintenance of the physical data storage devices; therefore, users of cloud storage services can avoid the initial and ongoing costs associated with buying and maintaining storage devices. Users of cloud storage services also avoid the administrative complexity arising from configuring, managing, and maintaining their own data storage systems. Cloud storage services typically charge users for consumption of storage resources, such as storage space and/or transfer bandwidth, on a marginal or subscription basis, with little or no upfront costs. In addition to the cost and administrative advantages, cloud storage services often provide dynamically scalable capacity to meet its users changing needs.

Many data storage systems are tasked with handling enormous amounts of data. Although cloud storage services often have sufficient storage capacity to store large data sets, the bandwidth limitations of the wide-area network connecting storage clients with the cloud storage service make transferring large data sets to the cloud service time consuming.

To reduce the time and bandwidth required to transfer large data sets over a WAN, WAN optimization devices may be used in pairs on both sides of the WAN connection. WAN optimization typically improves the data transfer rates over a WAN by compressing data at the source using a first WAN optimization device, communicating the compressed data via the WAN to a destination, and then decompressing the data at the destination using a second WAN optimization device. However, this double-ended WAN optimization technique is difficult and expensive to use with cloud storage services, because the cloud storage service provider must purchase and configure a WAN optimization device to work with the WAN optimization devices at the storage clients' locations.

Another prior approach to reducing the time and bandwidth required to transfer data to a cloud storage service over a WAN is to store the data in its compressed form in the cloud storage service. In this approach, a WAN optimization device compresses the data at the source and communicates the compressed data via the WAN to cloud storage service. The cloud storage service then stores the data in its compressed form. Although this approach eliminates the need for a second WAN optimization device at the cloud storage service, the stored data is no longer in its native, uncompressed form. As a result, any storage client that wishes to read the data stored in the cloud storage service must include or be associated with a WAN optimization device to decompress and convert the data back to its original form. This requirement is especially burdensome where the cloud data storage is used to distribute data to a large number of users (such as part of a content distribution network) or where the cloud data storage is used to deploy applications and data to distributed or cloud computing systems.

BRIEF DESCRIPTION OF THE DRAWINGS

The invention will be described with reference to the drawings, in which.

SUMMARY

Embodiments of the invention include a single-ended optimized storage protocol and systems and methods for optimized data transfer from a storage client to a cloud storage service or other type of remote data storage connected via a network. In an embodiment, the single-ended optimized storage protocol enables a storage client, cloud storage optimization device or application, or other type of application or operating system to direct a remote data storage to copy data. In response to commands via the single-ended optimized storage protocol, a remote data storage can copy any portion of a data stream at the remote data storage to a destination storage location within the same data stream or within a different data stream. The destination data stream may be stored at the remote data storage or a different remote data storage. The remote data storage may copy a portion of a data stream without transferring the data stream back to the storage client for processing.

A storage client, cloud storage optimization device or application, or other type of application or operating system may utilize the single-ended optimized storage protocol to optimize the transfer of data over a network between a storage client and a cloud storage service or other remote data storage. In an embodiment, a data stream is divided into segments. Redundant segments, which are segments that are identical to previously processed segments in the same or another data stream, are removed from the data stream to form a data stream optimized for transfer to the remote data storage.

In an embodiment, the optimized data stream is transferred to the remote data storage and stored. The storage client, cloud storage optimization device or application, or other type of application or operating system issues one or more commands via the single-ended optimized storage protocol to the remote data storage. These commands direct the remote data storage to reconstruct the initial data stream at the remote data storage using the contents of the optimized data stream and optionally segments from other data streams previously transferred to the remote data storage.

DETAILED DESCRIPTION

Embodiments of the invention reduce the time and bandwidth needed to transfer data to a storage device using a single-ended optimization architecture. Additionally, embodiments of the invention store data on the storage device in its native format, enabling any number of storage clients to access the data without the need for decompression or optimization devices.

To achieve these goals, embodiments of the invention include a single-ended optimized storage protocol for remotely copying data within or between data streams stored on a remote storage device. The single-ended optimized storage protocol enables a storage client to direct a remote storage device to copy some or all of the data in a data stream stored at the remote storage device. The data is copied by the remote storage device without the need to transfer data back to the storage client for intervening processing.

Figure 1A:
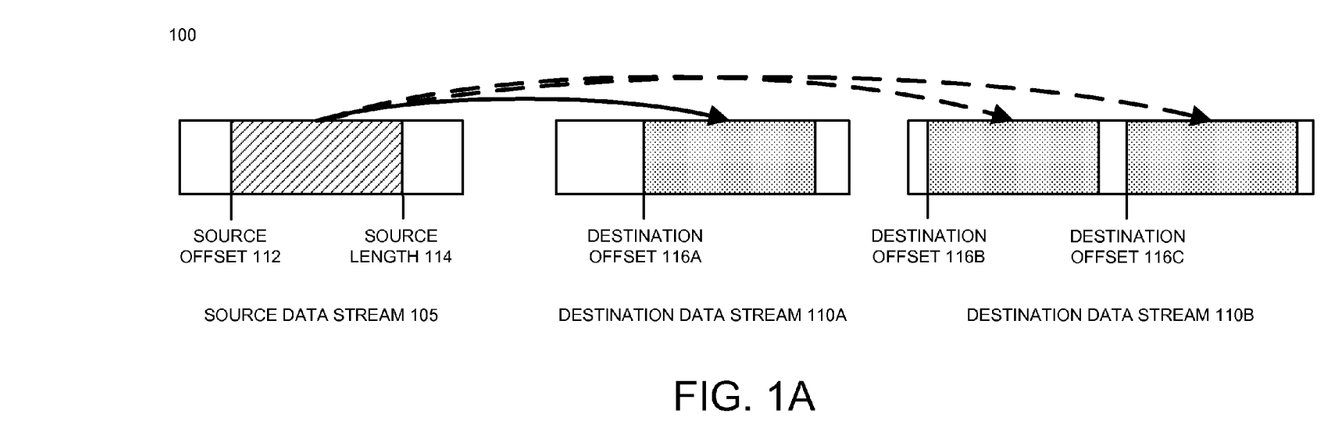
FIGS. 1A-1B illustrate operations of a single-ended optimized storage protocol according to an embodiment of the invention.
Figure 1B:
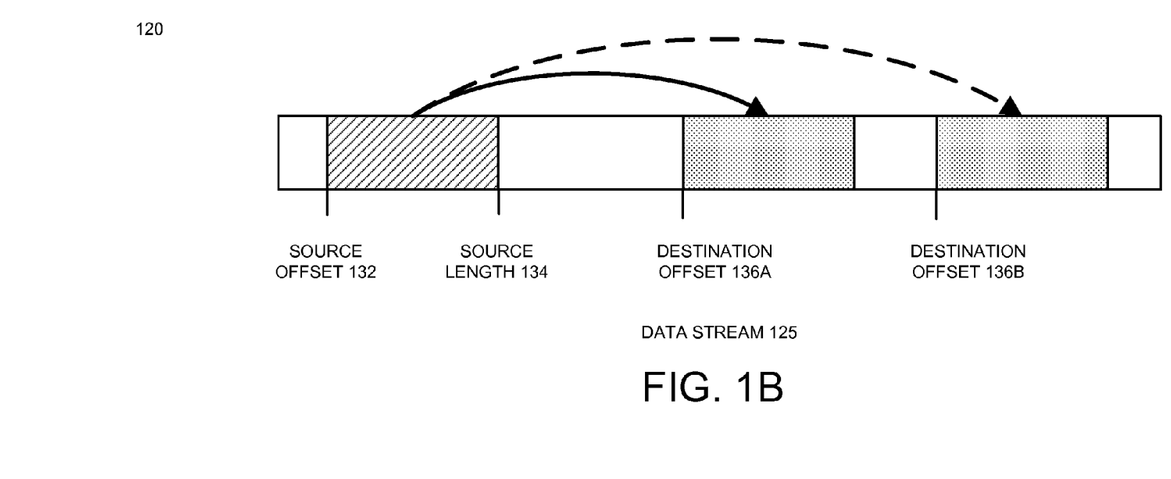

FIGS. 1A-1B illustrate operations of a single-ended optimized storage protocol according to an embodiment of the invention. FIG. 1A illustrates an example 100 of the single-ended optimized storage protocol according to an embodiment of the invention. Example 100 includes a source data stream 105 and one or more destination data streams 110 stored on a remote storage device.

Each data stream may be associated with a file; a serialized object or data structure; unstructured, semi-structured, or structured data; or any other arbitrary binary data. The remote storage device includes any physical or logical data storage device separate from the storage clients. The remote storage device may be connected with storage clients via one or more local-area networks (LANs), wide-area networks (WANs), and/or storage-area networks (SANs).

In example 100, the single-ended optimized storage protocol enables a storage client to direct the remote storage device to copy data from a source data stream 105 to at least one destination data stream 110a. In an embodiment, the storage client uses a storage interface API to identify source and destination data streams. Additionally, the storage client uses the storage interface API to select all or a portion of the data in the source data stream 105 to copy to the destination data stream 110a. In this example 100, the portion of the data is identified by a source offset 112 representing the location of the beginning of the data to be copied and source length representing the amount of data to be copied. Alternatively, the portion of the data to be copied may be specified by two source offsets representing the locations of the beginning and end of the data to be copied within the source data stream 105.

The storage client also uses the storage interface API to specify a copy destination location 116a in the destination data stream 110a. The remote storage device will overwrite any data in the destination data stream 110a that occupies the location intended for the copied data.

In a further embodiment, the storage interface API may optionally allow the storage client to specify multiple destination data streams and/or locations in the destination data streams for the copied data in a single protocol command. For example, data from source data stream 105 is copied to destination data streams 110a and 110b. Additionally, this data is copied to destination locations 116b and 116c in the destination data stream 110b. Conversely, if the storage interface API does not include the ability to specify multiple destination data streams and/or destination locations for data in a single protocol command, this functionality can be implemented by storage clients using multiple protocol commands.

FIG. 1B illustrates an example 120 of single-ended optimized storage protocol according to an embodiment of the invention. Example 120 includes a single data stream 125 acting as both the source and destination for copying data stored on a remote storage device. In example 120, the storage client uses a storage interface API to identify source data stream 125, the source offset 132, the source length 134, and one or more destination offsets 136.

As discussed above, in an embodiment of the invention, the remote storage device copies data between or within data streams stored by the remote storage device or between data streams stored by two or more remote storage devices in response to commands from storage clients using the single-ended optimized storage protocol. Moreover, these data copy operations can be performed by the remote storage devices without the need to transfer data back to the storage client for intervening processing.

The remote data storage devices may be implemented as one or more cloud storage services. Furthermore, embodiments of the single-ended optimized storage protocol may be implemented within a cloud storage communications protocol and/or using internet transport protocols, such as HTTP, standard web services protocols, such as SOAP, REST, or XML-RPC, and/or proprietary service protocols.

Using the single-ended optimized storage protocol, embodiments of the invention may reduce the time and bandwidth required to transfer data from a storage client to a cloud storage service via a WAN. Furthermore, embodiments of the invention using the single-ended optimized storage protocol do not require specialized WAN-optimization devices or additional decompression or computing capabilities at the cloud storage service provider. Moreover, although the single-ended optimized storage protocol enables storage clients to transfer data to cloud storage services with reduced time and bandwidth, the data is stored at the cloud storage service in its native form, making the data usable for other storage clients without WAN-optimization or decompression capabilities.

Figure 2:
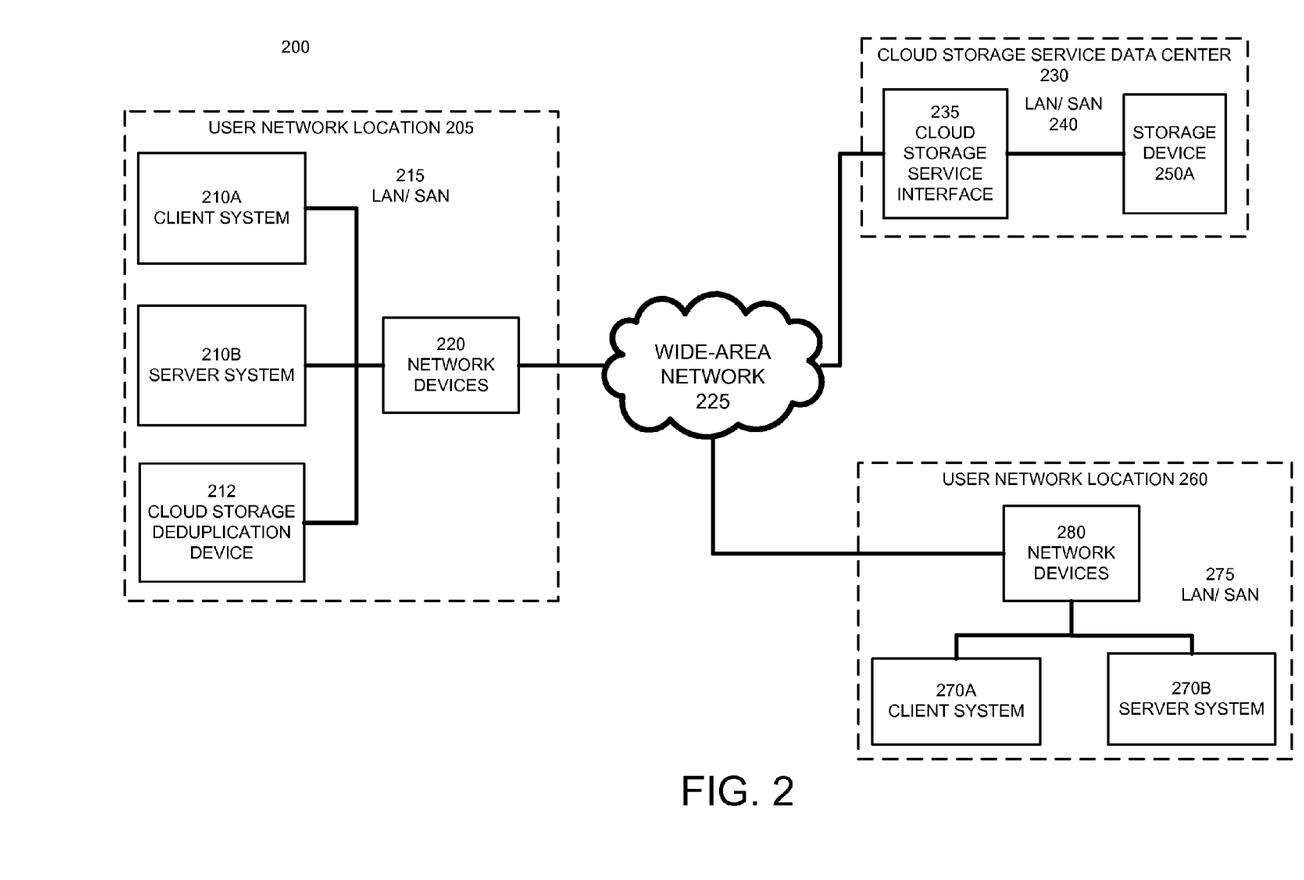
FIG. 2 illustrates a single-ended WAN optimization system suitable for use with cloud storage systems according to an embodiment of the invention.

FIG. 2 illustrates a single-ended WAN optimization system 200 suitable for use with cloud storage systems according to an embodiment of the invention. System 200 includes at least one user network location 205. User network location 205 includes one or more storage clients 210, such as storage clients 210a and 210b. Storage clients 210 may include any type of computer or other electronic device capable of accessing data from a cloud storage service, including client and/or server computers 210a and 210b. Storage clients 210 may include software adapted to facilitate access data from a cloud storage service, such as applications, libraries, software modules, application programming interfaces, or operating systems. Storage clients may communicate with cloud storage services via a cloud storage communications protocol. The cloud storage communications protocol may be based on internet transport protocols, such as HTTP, and standard web services protocols, such as SOAP, REST, or XML-RPC, or proprietary service protocols.

User network location 205 may include a local-area network (LAN) 215 for facilitating communications between storage clients 210 and cloud storage services. In a further embodiment, user network location 205 may include a storage-area network instead of or in addition to the local-area network 215. The local-area network 215 is connected with a wide-area network (WAN) 225, such as the internet or a private wide-area network. Other network devices 220, such as gateways, firewalls, and routers, may be used to connect the local-area network 210 with wide-area network 225.

Also connected with the wide-area network 225 is one or more cloud storage services. Each cloud storage service is implemented at one or more cloud storage service data centers, such as cloud storage service data center 230. Cloud storage service data center 230 includes a cloud storage service interface 235 and at least one data storage devices 250, such as a file server or disk or storage array system. Cloud storage service interface 235 receives data read and write requests using cloud storage protocols, for example based on web services protocols such as XML-RPC, SOAP or REST, and performs corresponding storage operations with the data storage devices 250. Additionally, cloud storage service interface 235 implements the single-ended optimized storage protocol described above to copy arbitrary selections of data within or between data streams as specified by one or more storage clients. Cloud storage service interface 235 may be connected with the data storage devices 250 via local-area networks and/or storage-area networks 240. Cloud storage service interface 235 may access data storage devices using file system protocols, such as CIFS or NFS, and/or block-based storage protocols, such as iSCSI or iFCP.

To reduce the bandwidth and time required to transfer data from storage clients 210 at the user network location 205, an embodiment of system 200 includes cloud storage optimization device 212. As described in detail below, cloud storage optimization device 212 receives a data stream from a storage client 210, removes redundant information from this data stream to reduce its size, transfers the optimized data stream via the WAN 225 to the cloud storage service data center 230 for storage in storage device 250, and then generates one or more commands using the single-ended optimized storage protocol to direct the cloud storage service interface 235 to reconstruct the initial data stream in the storage device 250.

In embodiments of the invention, cloud storage optimization device 212 intercepts network traffic from storage clients 210 to identify storage write requests using cloud storage protocols. The cloud storage optimization device 212 then optimizes the intercepted data streams from the storage clients 210. In another embodiment, the cloud storage optimization device 212 presents an interface to storage clients 210 as if it were a remote cloud storage service. In this embodiment, the cloud storage optimization device 212 receives storage write requests from the storage clients 210 via a cloud storage protocol and optimizes the received data streams before transferring them to the cloud storage service. In still another embodiment, the cloud storage optimization device 212 presents one or more virtual storage devices to the storage clients 210. The virtual storage devices may be accessed by storage clients 210 using a file system protocol, such as CIFS or NFS, a block-based storage protocols, such as iSCSI or iFCP, and/or any other type of standard or proprietary storage device protocol. In this embodiment, the cloud storage optimization device 212 receives storage write requests from storage clients to one or more virtual storage devices, converts the received data into optimized data streams, and transfers the optimized data streams to the cloud storage service using a cloud storage protocol and/or a single-ended optimized storage protocol.

Embodiments of the cloud storage optimization device 212 may be implemented as a standalone device; integrated with other network devices, such as WAN optimization or storage virtualization devices; or as software executing on one or more of the storage clients 210.

In addition to user network location 210, embodiments of system 200 may include one or more additional user network locations 260. Additional user network location 260 include storage clients 270 and network devices 280, such as gateways, firewalls, and routers, to connect the local-area network and/or storage-area network 275 with wide-area network 225. However, unlike user network location 205, additional user network location 260 does not include a cloud storage optimization device. Thus, storage clients 270 at additional user network location 260 do not receive the advantages of optimized data transfer to the cloud storage service. However, because the data streams are stored in their native format, rather than a compressed format, by the cloud storage service, storage clients 270 are able to access and use data streams without any additional intervening decompression applications or devices. System 200 may be used to enable storage clients 210 to distribute data efficiently to storage clients 270 at one or more additional network locations 260 and to other entities.

Figure 3:
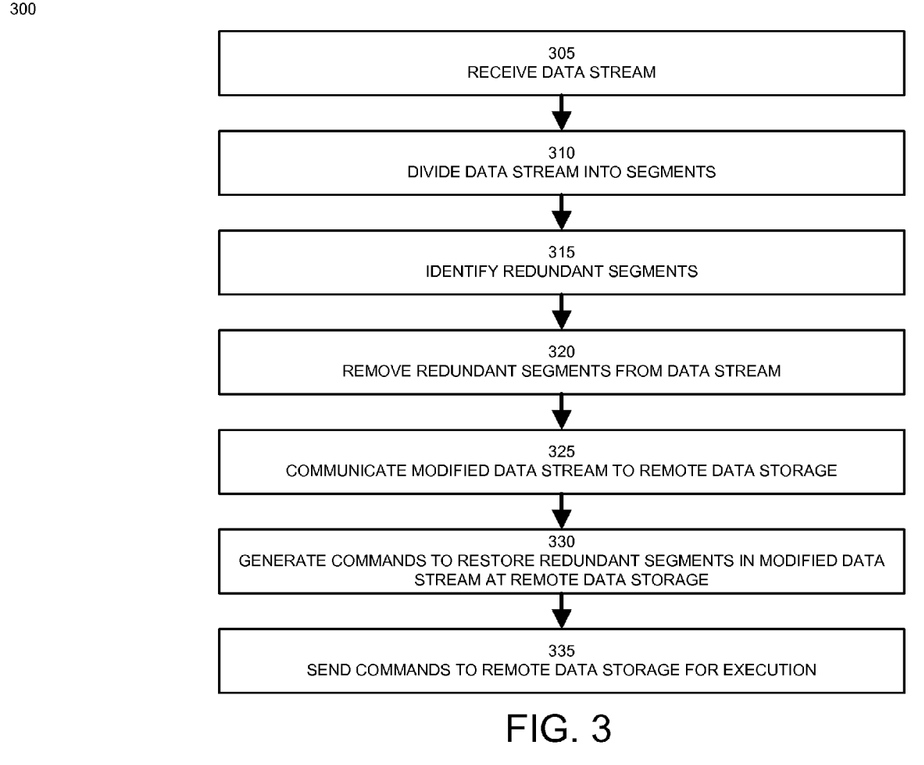
FIG. 3 illustrates a method of optimizing the transfer of data to a storage device according to an embodiment of the invention.

As described above, a cloud storage optimization device or application receives a data stream from a storage client, removes redundant information from this data stream to reduce its size, transfers the optimized data stream via the WAN to the cloud storage service data center for storage, and then generates one or more commands using the single-ended optimized storage protocol to direct the cloud storage service to reconstruct the initial data stream at the cloud storage service data center. To this end, FIG. 3 illustrates a method 300 of optimizing the transfer of data to a storage device according to an embodiment of the invention. Method 300 may be implemented by a cloud storage optimization device or application and/or an application or operating system executed by a storage client.

Step 305 receives all or a portion of a data stream from a storage client. A data stream may be associated with a file; a serialized object or data structure; unstructured, semi-structured, or structured data; or any other arbitrary binary data.

Step 310 divides the received data stream into one or more segments using any segmentation algorithm known in the art. Embodiments of step 310 may divide the data stream into segments based on factors including the contents of the data stream, the potential size of a segment, and/or the type of data in the data stream. Step 310 may use hashes, checksums, or other data characterization techniques to segment the data stream. Segments may be organized with respect to each other in flat or hierarchical relationships. Segments may be of fixed or variable length.

Step 315 identifies redundant segments. In an embodiment, a segment is redundant if another segment with identical contents exists elsewhere in the received data stream or optionally in a data stream previously processed. An embodiment of step 315 identifies redundant segments by determining a hash, checksum, and/or other data characterization based on the contents of a given segment. The value of this data characterization of a segment is compared with the data characterization values of previously processed segments. If the data characterization value of a given segment matches that of a previously processed segment, step 315 specifies that the given data segment is redundant. In another embodiment, step 315 identifies redundant segments by comparing the contents of a new segment with the contents of previously processed segments. This direct data comparison may be performed instead of or in addition to the comparison of data characterization values of segments. Step 315 performs this evaluation for all of the segments produced by step 310.

In an embodiment, a cloud storage service optimization device or application maintains records of the data characterization values of some or all of the previously processed segments and/or the contents of previously processed segments. Step 315 compares the data characterization value and/or the contents of a given segment with these records to determine if the given segment is redundant. In a further embodiment, these records are associated with information identifying the locations of these previously processed segments, such as their associated data streams, beginning offsets in their respective data streams, and segment lengths or ending offsets.

In another embodiment, each unique segment is stored separately on a remote storage device. In this embodiment, step 315 access the remote storage device to determine if a given segment matches a previously stored segment. In a further embodiment, the unique segments are stored in association with file names or other identifiers corresponding to their data characterization values. Thus, step 315 may determine if a given segment is redundant by comparing its data characterization value with the file names or other identifiers of the segments stored in the remote data storage. If the remote data storage includes any segment having a file name or other identifier corresponding with the data characterization value of a given segment, then this segment is redundant.

Step 320 removes redundant segments from the data stream. Step 320 records the identity of each redundant segment and its location in the data stream so that these segments can later be restored to the data stream. In an embodiment, step 320 replaces the data of a redundant segment with data that can be easily compressed, such as a constant value like '0' or '1'. In another embodiment, step 320 removes a redundant segment and replaces it with the contents of the next non-redundant segment.

Step 325 communicates a modified version of the received data stream to the remote storage device. In an embodiment, the modified version of the received data stream includes the non-redundant segments and does not include the redundant segments. The modified data stream may optionally include padding or other easily compressed data as a placeholder for the redundant segments.

Step 325 communicates the modified data stream to a remote data storage. The remote data storage may include a cloud storage service connected with the storage client providing the initial data stream via a wide-area network. In an embodiment, step 325 uses a cloud storage protocol, for example based on web services protocols such as XML-RPC, SOAP or REST, to transfer the modified data stream to the remote data storage. Because the modified data stream does not include the redundant segments, the bandwidth and time required to transfer the modified data stream to the remote data storage is typically much less than the amount of bandwidth and time that would be required by the initial data stream.

Step 330 generates one or more commands using the single-ended optimized storage protocol to restore the redundant segments to the modified data stream stored in the remote data storage, thereby reconstructing the initial data stream at the remote data storage. In an embodiment, step 330 generates at least one single-ended optimized storage protocol copy command for each segment to be restored to the modified data stream.

As discussed above, an embodiment of a single-ended optimized storage protocol copy command includes a source data stream identifier, a source offset, a source length or source ending offset, a destination data stream identifier, and a destination offset. For each redundant data segment to be restored to the modified data stream, an embodiment of step 330 creates a single-ended optimized storage protocol copy command with the source data stream identifier, source offset, and source length set to a location of a previously stored copy of the segment on the remote data storage. This previously stored copy of a segment may be part of a previously processed data stream or in another part of the modified data stream. Embodiments of step 330 use its records of previously processed segments and their storage locations and/or queries of the contents of the remote data storage to determine the location of the previously stored copy of the segment for the single-ended optimized storage protocol copy command.

Similarly, step 330 sets the destination data stream identifier and destination offset in the single-ended optimized storage protocol copy command to the location of the previously removed redundant segment. In an embodiment, step 330 sets the destination data stream identifier to the modified data stream so that redundant segments are copied into the modified data stream by the remote data storage. The one or more single-ended optimized storage protocol copy commands generated by step 330 will direct the remote data storage to further alter the modified data stream so that its contents are identical to the initial data stream. In another embodiment, step 330 sets the destination data stream identifier to a different data stream in the remote data storage. In this embodiment, step 330 creates a new data stream identical to the initial data stream by copying non-redundant segments from the modified data stream to this new data stream and copying redundant segments from the modified data stream and/or other data streams to the new data stream.

Step 335 sends the single-ended optimized storage protocol copy commands generated by step 330 to the remote data storage for execution. The remote data storage executes these copy commands to copy redundant segments into their appropriate places in the modified data stream, thereby reconstructing the initial data stream on the remote data storage.

Because the single-ended optimized storage protocol copy commands executed by the remote data storage copies segments without the need for intervening transfer to the storage client or cloud storage optimization device for processing, these copy commands can be completed relatively quickly and typically in much less time than it would take to transfer the initial data stream with its redundant segments directly to the remote data storage. This performance advantage typically exists where the remote data storage is connected with the storage client via a local-area network and/or wide-area network.

As described above, redundant segments are removed from a data stream to create an optimized data stream for transfer via a local-area and/or wide-area network to a remote data storage. Redundant segments may be any segment found in a previously processed data stream or in portions of the current data stream previously processed. Segments from previously processed portions of the current data stream may be used if the data stream is the first data stream to be transferred to the remote data storage or if some segments are repeated within a data stream but not found in any other previously processed data stream.

Figure 4:
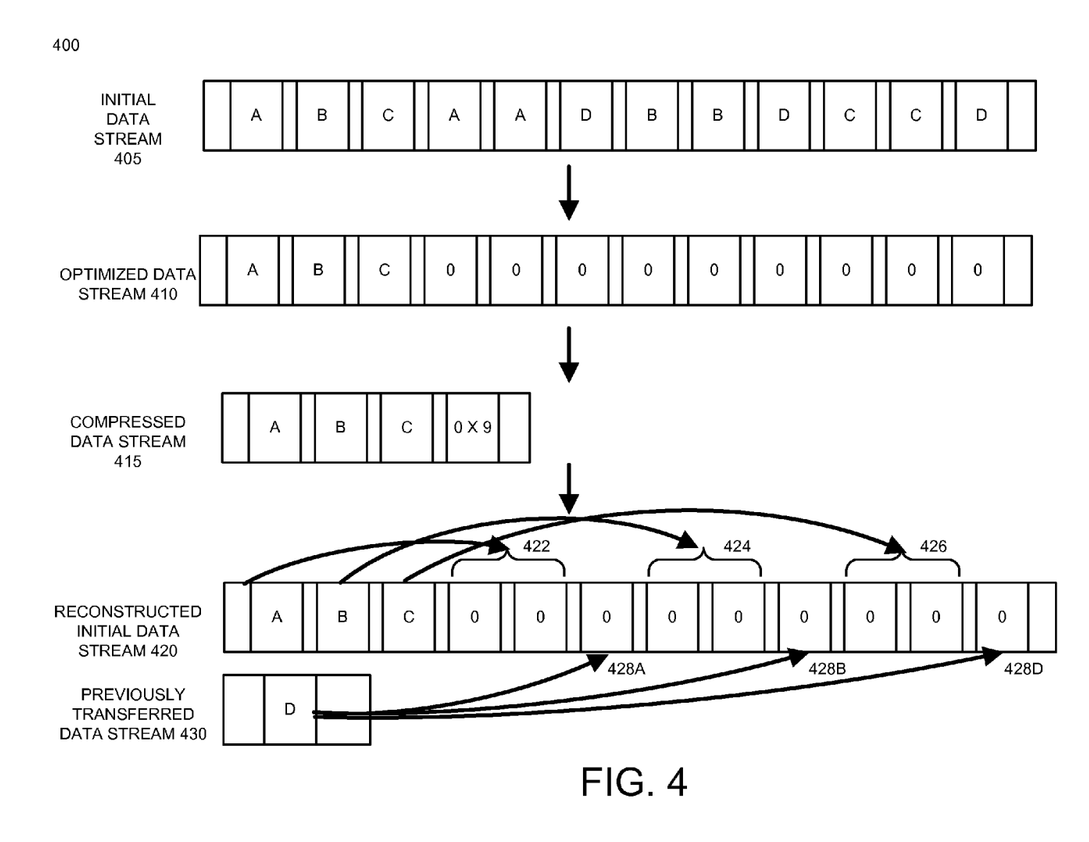
FIG. 4 illustrates an example optimization of a data stream according to an embodiment of the invention.

FIG. 4 illustrates an example optimization 400 of a data stream according to an embodiment of the invention. An initial data stream 405 is output from a storage client to be stored in remote data storage, such as a file server connected via a local-area network or a cloud storage service connected via a wide-area network. In this example 400, the storage client, a cloud storage optimization device or application, or other application or device, divides the data stream 405 into segments. Example data stream 405 is comprised of unique segments A, B, C, and D, each of which is repeated several times within this data stream.

The initial data stream 405 is converted to an optimized data stream 410 by removing redundant segments. In this example 400, redundant segments are replaced with easily compressed data, such as zeros or other constant values, in optimized data stream 410. For this example 400, the cloud storage optimization device or other entity processing the data stream determines that segments A, B, and C, although repeated within the initial data stream 405, have not been previously been transferred to the remote data storage. Therefore, the optimized data stream 410 includes a single copy of segments A, B, and C. In this example, segment D has been previously transferred to the remote data storage and thus all copies of this segment can be removed from the optimized data stream 410.

The optimized data stream 410 is then transferred to the remote data storage via a local-area, wide-area, and/or storage area network. Because the redundant segments have been replaced with zeros in this example, the data compression built into many network and/or storage interfaces, such as run-length encoding, reduces the optimized data stream 410 to a compressed data stream 415 of reduced size. Upon receipt of the compressed data stream 415, the remote data storage decompresses the data stream and stores the result in the form of the optimized data stream.

Following storage of the optimized data stream at the remote data storage, the storage client, cloud storage optimization device or application, or other application or device generates one or more single-ended optimized storage protocol commands to direct the remote data storage to reconstruct the initial data stream on the remote data storage. Example 400 illustrates the reconstruction 420 of the initial data stream on the remote data storage. One or more single-ended optimized storage protocol copy commands are executed by the remote data storage to copy segment A to locations 422. Similarly, one or more single-ended optimized storage protocol copy commands are executed by the remote data storage to copy segments B and C to locations 424 and 426, respectively. Because segment D was previously transferred to the remote data storage as part of a different data stream, one or more single-ended optimized storage protocol copy commands are executed by the remote data storage to copy segment D from previously transferred data stream 430 to locations 428 in the reconstructed data stream 420. Once a data stream has been reconstructed at the remote data storage, the data stream may be read by any number of storage clients in its native format.

As described above, embodiments of the invention may also utilize segments from previously transferred data streams to reduce the size of new data stream to be transferred to the remote data storage. However, this requires that the cloud storage optimization device or application, or other application or device, have an accurate record of the segments previously transferred to the remote data storage. If a first cloud storage optimization device transfers a data stream to a remote data storage using the optimized data transfer and another storage client later deletes or modifies this data stream, the first cloud storage optimization device's record of segments stored on the remote data storage may become inaccurate. This can cause errors in reconstruction of data streams at the remote data storage.

There are several approaches to prevent these types of reconstruction errors. First, storage clients may be restricted to read-only access for data streams that the cloud storage optimization device may use to reconstruct further data streams. Second, the cloud storage optimization device may verify the existence and/or contents of segments on the remote data storage during the identification of redundant segments in new data streams. This approach may be implemented by including a query function in the single-ended optimized storage protocol that returns a hash, checksum, or other data characterization of specified data stored in the remote data storage to the cloud storage optimization device.

A third approach to preventing reconstruction errors includes storing copies of segments separately in the remote data storage in addition to the data streams provided to other storage clients. These separate copies of the segments are hidden and/or protected from modification or deletion from other storage clients. The cloud storage optimization device may use these copies of the segments on the remote data storage as the source for reconstructing an initial data stream.

Embodiments of the invention may store a copy of each segment as a separate data stream or alternatively store a copy of two or more segments in a single data streams. A cloud storage optimization device or application may maintain records regarding the contents and access parameters (such as data stream identifiers or storage locations) of the copies of the segments. Alternatively, an embodiment of the cloud storage optimization device may rely on metadata associated with the segments stored on the remote data storage to identify the segments. For example, each segment stored on the remote data storage may be associated with a file name, data stream identifier, or other metadata field set to the value of the hash of its contents. The cloud storage optimization device may retrieve the metadata associated with segments stored at the remote data storage to determine whether segments in a data stream being processed are already stored at the remote data storage and thus are redundant.

Figure 5:
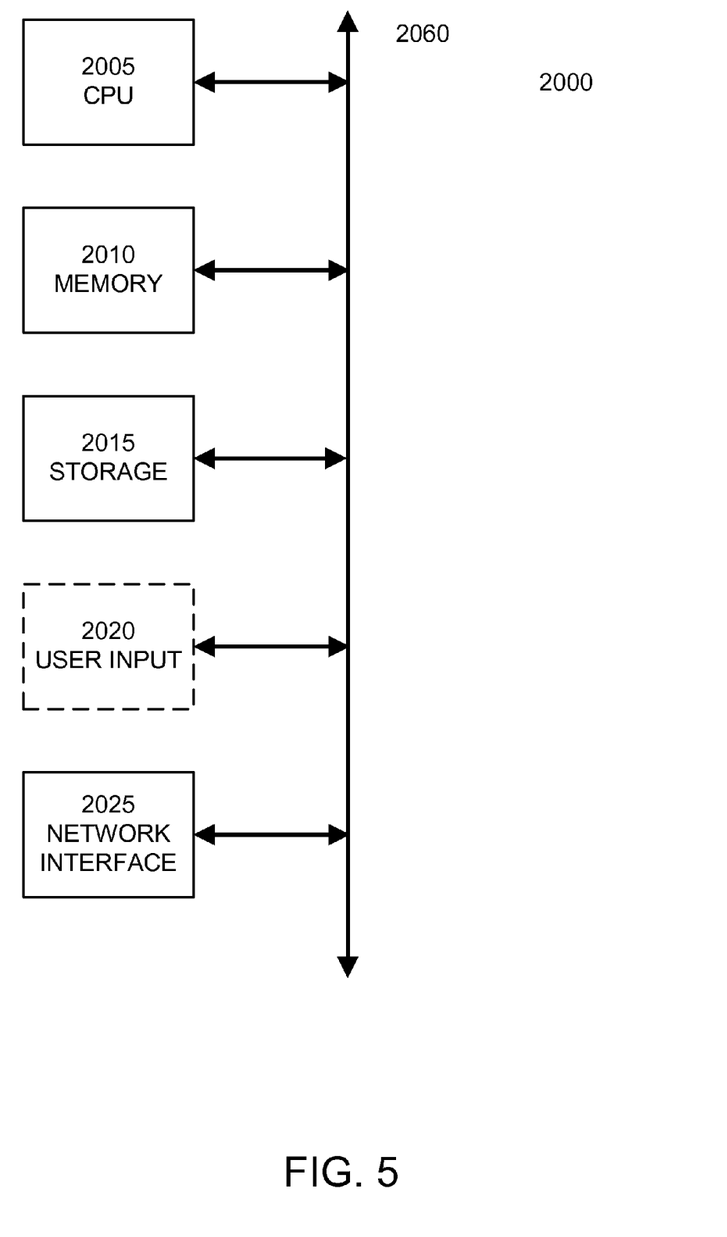
FIG. 5 illustrates a computer system suitable for implementing embodiments of the invention.

FIG. 5 illustrates a computer system suitable for implementing embodiments of the invention. FIG. 5 is a block diagram of a computer system 2000, such as a personal computer or other digital device, suitable for practicing an embodiment of the invention. Embodiments of computer system 2000 may include dedicated networking devices, such as wireless access points, network switches, hubs, routers, hardware firewalls, WAN and LAN network traffic optimizers and accelerators, network attached storage devices, storage array network interfaces, and combinations thereof.

Computer system 2000 includes a central processing unit (CPU) 2005 for running software applications and optionally an operating system. CPU 2005 may be comprised of one or more processing cores. Memory 2010 stores applications and data for use by the CPU 2005. Examples of memory 2010 include dynamic and static random access memory. Storage 2015 provides non-volatile storage for applications and data and may include fixed or removable hard disk drives, flash memory devices, ROM memory, and CD-ROM, DVD-ROM, Blu-ray, HD-DVD, or other magnetic, optical, or solid state storage devices.

In a further embodiment, CPU 2005 may execute virtual machine software applications to create one or more virtual processors capable of executing additional software applications and optional additional operating systems. Virtual machine applications can include interpreters, recompilers, and just-in-time compilers to assist in executing software applications within virtual machines. Additionally, one or more CPUs 2005 or associated processing cores can include virtualization specific hardware, such as additional register sets, memory address manipulation hardware, additional virtualization-specific processor instructions, and virtual machine state maintenance and migration hardware.

Optional user input devices 2020 communicate user inputs from one or more users to the computer system 2000, examples of which may include keyboards, mice, joysticks, digitizer tablets, touch pads, touch screens, still or video cameras, and/or microphones. In an embodiment, user input devices may be omitted and computer system 2000 may present a user interface to a user over a network, for example using a web page or network management protocol and network management software applications.

Computer system 2000 includes one or more network interfaces 2025 that allow computer system 2000 to communicate with other computer systems via an electronic communications network, and may include wired or wireless communication over local area networks and wide area networks such as the Internet. Computer system 2000 may support a variety of networking protocols at one or more levels of abstraction. For example, computer system may support networking protocols at one or more layers of the seven layer OSI network model. An embodiment of network interface 2025 includes one or more wireless network interfaces adapted to communicate with wireless clients and with other wireless networking devices using radio waves, for example using the 802.11 family of protocols, such as 802.11a, 802.11b, 802.11g, and 802.11n.

An embodiment of the computer system 2000 may also include one or more wired networking interfaces, such as one or more Ethernet connections to communicate with other networking devices via local or wide-area networks.

The components of computer system 2000, including CPU 2005, memory 2010, data storage 2015, user input devices 2020, and network interface 2025 are connected via one or more data buses 2060. Additionally, some or all of the components of computer system 2000, including CPU 2005, memory 2010, data storage 2015, user input devices 2020, and network interface 2025 may be integrated together into one or more integrated circuits or integrated circuit packages. Furthermore, some or all of the components of computer system 2000 may be implemented as application specific integrated circuits (ASICS) and/or programmable logic.

Further embodiments can be envisioned to one of ordinary skill in the art. In other embodiments, combinations or subcombinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of transferring data to a remote data storage, the method comprising:
   dividing, at a first network location, at least a portion of a first data stream into segments;
   identifying a first segment in the first data stream that is a duplicate of a second segment in a second data stream, wherein the second data stream is stored in a remote data storage at a second network location;
   removing, at the first network location, at least the first segment from the first data stream to form an optimized data stream;
   recording, at the first network location, an identity and location of at least the first segment within the first data stream;
   transferring the optimized data stream from the first network location to the remote data storage at the second network location;
   generating, at the first network location, a copy command that at least identifies the second data stream, a source location of the second segment within the second data stream, a source length of the second segment, and a destination location of the removed first segment within the optimized data stream, wherein the recorded identity and location of the first segment within the first data stream is used to generate the copy command; and
   sending the copy command from the first network location to the remote data storage at the second network location, wherein the remote data storage executes the copy command which causes the remote data storage to copy the second segment from the source location in the second data stream to the destination location in the optimized data stream, thereby reconstructing the first data stream in the remote data storage at the second network location without transferring any portion of the optimized data stream or the first segment back to the first network location, and wherein the remote data storage does not require an optimization device to reconstruct the first data stream.

2. The method of claim 1, wherein the identified second data stream is the first data stream, and wherein, upon receiving the copy command, the remote data storage copies the second segment stored by the remote data storage to at least one destination location in the optimized data stream.

3. The method of claim 2, wherein the first segment is included in the optimized data stream.

4. The method of claim 2, wherein the first segment is included in a second data stream previously transferred to the remote data storage.

5. The method of claim 2, wherein the first segment is protected from modification and deletion by an additional storage client.

6. The method of claim 2, wherein the first segment is hidden from an additional storage client.

7. The method of claim 1, wherein identifying the portion of segments that are redundant comprises:
   determining a data characterization for each of the segments of the first data stream; and
   comparing the data characterizations with data characterizations of previously processed segments to identify segments of the first data stream matching previously processed segments.

8. The method of claim 7, wherein comparing the data characterizations of previously processed segments comprises:
   accessing first records of the data characterizations stored at the first network location.

9. The method of claim 8, wherein the first records are associated with second records identifying storage locations at the remote data storage of the previously processed segments.

10. The method of claim 7, wherein comparing the data characterizations of previously processed segments comprises:
    accessing metadata including the data characterizations from the remote data storage, wherein the metadata is associated with previously processed segments stored by the remote data storage.

11. The method of claim 10, wherein the metadata identifies the previously processed segments stored by the remote data storage.

12. The method of claim 1, wherein identifying the portion of segments that are redundant comprises:

comparing contents of the segments of the first data stream with contents of previously processed segments to identify segments of the first data stream matching previously processed segments.

13. The method of claim 1, wherein removing at least the first segment from the first data stream to form an optimized data stream comprises:
replacing the first segment with easily compressed data.

14. The method of claim 13, wherein the easily compressed data is equal in size to its corresponding segment that is removed from the first data stream.

15. The method of claim 1, wherein the first network location is connected with the second network location including the remote data storage via a wide-area network.

16. The method of claim 1, wherein the copy command does not include any portion of the first data stream.

17. The method of claim 2, wherein the copy command includes a source offset and a source ending offset instead of a source location and source length, respectively, of the first segment in the second data stream.

18. The method of claim 2, wherein the copy command includes at a destination offset specifying the destination location.

19. The method of claim 1, wherein the copy command is communicated via a web services protocol.

20. The method of claim 1, wherein the first data stream is received from a storage client.

21. The method of claim 20, wherein the first data stream is received via a web services protocol.

22. The method of claim 20, wherein the first data stream is received via a file protocol.

23. The method of claim 22, wherein the first data stream is received via a block based storage protocol.

24. The method of claim 2, wherein a single generated copy command is to restore a single data segment to the optimized data stream.

25. A non-transitory computer-readable storage medium storing instructions that, when executed by a computer, cause the computer to perform a method for transferring data to a remote data storage, the method comprising:
dividing, at a first network location, at least a portion of a first data stream into segments;
identifying a first segment in the first data stream that is a duplicate of a second segment in a second data stream, wherein the second data stream is stored in a remote data storage at a second network location;
removing, at the first network location, at least the first segment from the first data stream to form an optimized data stream; recording, at the first network location, an identity and location of at least the first segment within the first data stream;
transferring the optimized data stream from the first network location to the remote data storage at a second network location;
generating, at the first network location, a copy command that at least identifies data stream, a source location of the second segment within the second data stream, a source length of the second segment, and a destination location of the removed first segment within the optimized data stream, wherein the recorded identity and location of the first segment within the first data stream is used to generate the copy command; and
sending the copy command from the first network location to the remote data storage at the second network location, wherein the remote data storage executes the copy command which causes the remote data storage to copy the second segment from the source location in the second data stream to the destination location in the optimized data stream, thereby reconstructing the first data stream in the remote data storage at the second network location without transferring any portion of the optimized data stream or the first segment back to the first network location, and wherein the remote data storage does not require an optimization device to reconstruct the first data stream.

26. An apparatus for transferring data to a remote data storage, the apparatus comprising:
a processor; and
a memory storing instructions executable by the processor, the instructions comprising:
instructions to divide, at a first network location, at least a portion of a first data stream into segments;
instructions to identify a first segment in the first data stream that is a duplicate of a second segment in a second data stream, wherein the second data stream is stored in a remote data storage at a second network location;
instructions to remove, at the first network location, at least the first segment from the first data stream to form an optimized data stream;
instructions to record, at the first network location, an identity and location of at least the first segment within the first data stream;
instructions to transfer the optimized data stream from the first network location to the remote data storage at the second network location;
instructions to generate, at the first network location, a copy command that at least identifies the second data stream, a source location of the second segment within the second data stream, a source length of the second segment, and a destination location within the optimized data stream, wherein the recorded identity and location of the first segment within the first data stream is used to generate the copy command; and
instructions to send the copy command from the first network location to the remote data storage, wherein the remote data storage executes the copy command which causes the remote data storage to copy the second segment from the source location in the second data stream to the destination location in the optimized data stream, thereby reconstructing the first data stream in the remote data storage at the second network location without transferring any portion of the optimized data stream or the first segment back to the first network location, and wherein the remote data storage does not require an optimization device to reconstruct the first data stream.

* * * * *